United States Patent [19]

McEdwards

[11] 4,401,619

[45] Aug. 30, 1983

[54] NUCLEAR REACTOR SEALING SYSTEM

[75] Inventor: James A. McEdwards, Calabasas, Calif.

[73] Assignee: Rockwell International Corporation, El Sequndo, Calif.

[21] Appl. No.: 219,560

[22] Filed: Dec. 23, 1980

[51] Int. Cl.³ .............................................. G21C 13/06
[52] U.S. Cl. .................................. 376/206; 137/251; 220/228; 220/426; 376/310
[58] Field of Search ...................... 376/203, 205, 206; 220/460, 310, 217, 228, 232, 240, 426; 137/251, 247.41, 254

[56] References Cited

U.S. PATENT DOCUMENTS

| 3,514,115 | 5/1970 | Gallo | 277/34.3 |
|---|---|---|---|
| 4,026,763 | 5/1977 | Poindexter | 176/87 |
| 4,069,100 | 1/1978 | Cooper | 176/37 |
| 4,078,969 | 3/1978 | Garin | 176/87 |
| 4,080,254 | 3/1978 | Poindexter | 376/206 |
| 4,113,564 | 9/1978 | Garin et al. | 176/87 |
| 4,135,973 | 1/1979 | Golden | 176/87 |
| 4,181,572 | 1/1980 | Wade | 376/206 |

Primary Examiner—Harvey E. Behrend
Attorney, Agent, or Firm—Henry Kolin; Clark E. DeLarvin; H. Fredrick Hamann

[57] ABSTRACT

A liquid metal-cooled nuclear reactor sealing system. The nuclear reactor includes a vessel sealed at its upper end by a closure head. The closure head comprises at least two components, one of which is rotatable; and the two components define an annulus therebetween. The sealing system includes at least a first and second inflatable seal disposed in series in an upper portion of the annulus. The system further includes a dip seal extending into a body of insulation located adjacent a bottom portion of the closure head. The dip seal comprises a trough formed by a lower portion of one of the components, and a seal blade pendently supported from the other component and extending downwardly into the trough. A body of liquid metal is contained in the trough which submerges a portion of the seal blade. The seal blade is provided with at least one aperture located above the body of liquid metal for providing fluid communication between the annulus intermediate the dip seal and the inflatable seals, and a body of cover gas located inside the vessel. There also is provided means for introducing a purge gas into the annulus intermediate the inflatable seals and the seal blade. The purge gas is introduced in an amount sufficient to substantially reduce diffusion of radioactive cover gas or sodium vapor up to the inflatable seals. The purge gas mixes with the cover gas in the reactor vessel where it can be withdrawn from the vessel for treatment and recycle to the vessel.

7 Claims, 4 Drawing Figures

NUCLEAR REACTOR SEALING SYSTEM

BACKGROUND OF THE INVENTION

The Government has rights in this invention pursuant to Contract No. DE-AT03-76SF76026 awarded by the U.S. Department of Energy.

The invention relates generally to a sealing system for nuclear reactors and more particularly to a system for sealing the annulus about a rotating plug in a liquid metal-cooled nuclear reactor wherein the top of the rotating plug is maintained at substantially ambient temperatures.

A nuclear reactor produces heat by fissioning of nuclear materials which are fabricated into fuel elements and assembled within a nuclear core situated in a pressure vessel. In most commercial nuclear reactors, the heat produced is used to generate electricity. Generally, a nuclear reactor will comprise one or more primary flow and heat transfer systems and a corresponding number of secondary flow and heat transfer systems to which a conventional steam generator turbine and electrical generator are coupled. Thus, a typical nuclear conversion process for a commercial nuclear reactor involves the transfer of heat from a nuclear reactor core to a primary coolant flow system, then to a secondary coolant flow system, and finally into steam from which electricity is generated.

In a liquid metal-cooled nuclear reactor, such as a sodium-cooled breeder reactor, the liquid sodium is circulated through a primary coolant flow system. The primary system comprises a nuclear reactor core within a reactor vessel, a heat exchanger, a primary circulating pump, and associated interconnecting piping. In some breeder reactors wherein there is more than one primary system, the nuclear reactor core and reactor pressure vessel are common to each of the primary systems. The heat generated by the nuclear reactor core is removed by the liquid sodium which flows into the reactor vessel and through the reactor core. The heated sodium then exits from the reactor vessel and flows into the heat exchanger which transfers heat to a secondary flow system associated therewith. The cooled sodium leaving the heat exchanger flows to a pump and is returned to the pressure vessel.

In most nuclear reactor designs, an upper portion of the reactor vessel also includes one or more rotatable plugs. For example, there will be provided one large rotatable plug with others of various size disposed eccentrically within one another and within the large rotatable plug. The purpose of having rotatable plugs is to provide support for and a means of appropriately positioning a refueling machine. Since the plugs must be free to rotate, it is essential that there be a gap. The gap defines an annulus between the plugs and between the larger plug and the vessel. The annulus, while permitting the free rotation of the plugs, also provides a path for the escape of radioactive particles from the interior of the reactor. Accordingly, seals are provided at various locations across the annulus to prevent the release of radioactive particles. The seals also function to prevent oxygen in the atmosphere outside the reactor vessel from passing through the annulus and contacting the reactor coolant, for example, liquid sodium, where such contact could result in the formation of impurities in the liquid sodium, i.e., sodium oxides. To further prevent the possibility of oxygen leakage into the reactor vessel, it is customary to provide an inert cover gas that fills the space from the top of the reactor coolant pool to the bottom surface of the rotating plugs and also the annulus at least up to the seals across the annulus.

One type of seal frequently employed in nuclear reactors is a liquid dip seal. The rotating plug or the surrounding body is contoured to form a trough; the other member has a blade extending down into the trough which is immersed in a pool of liquid sodium contained in the trough, thus dividing the annulus into two sections, one above the liquid sodium in the trough and the other below. The cover gas inside the reactor, which may contain radioactive particles, then extends only from the top of the reactor coolant pool up through the annulus to the liquid sodium dip seal. The problem with this type of seal is that at least during rotation of the plugs, the sodium must be maintained in a liquid state by heating. Thus, a substantial amount of heat is transferred through the plug. Further, in the event of a sudden pressure spike in the cover gas, the sodium could be expelled from the trough. Thus, a dip seal alone would be ineffective under certain hypothesized conditions.

Another type of closure or plug seal well known in the art is an inflatable seal wherein single or multiple inflatable seals in series are placed across the annulus. During reactor refueling, the inflatable seals are slightly deflated to allow easier rotation of the rotating plugs; and during normal reactor operation, the seals may be inflated to their maximum pressure rating to increase their sealing capability. An example of this type of seal is found in U.S. Pat. No. 3,514,114, issued to S. Gallo. Neither of the foregoing types of seals, alone or in combination, has been altogether satisfactory. Accordingly, more recent designs include both two or more inflatable seals in series and a dip seal, and further include some other feature to enhance the effectiveness and reliability of the sealing system.

In U.S. Pat. No. 4,026,763 to A. M. Poindexter, there is disclosed such a combination of inflatable seals and dip seal in series having an improved liquid metal dip seal. The trough of the dip seal has two legs of differing widths communicating under a seal blade. The wide leg is in communication with the cover gas of the reactor, and the narrow leg is in communication with an inflatable plug or seal located in the annulus above the dip seal. The annulus contains an inert cover gas which acts as a pneumatic spring. An increase in the cover gas pressure depresses the sodium level in the wide leg and greatly increases the level in the narrow leg. The inert gas is compressed and the two together further resist substantial sodium level changes in the dip seal.

U.S. Pat. No. 4,078,969 to John Garin, discloses a core disruptive accident margin seal. The apparatus disclosed therein is for sealing the annulus between riser assemblies and comprises a flexible member disposed in the annulus and attached to an actuating mechanism. The actuating mechanism is capable of pulling the flexible member into contact with the components of the riser assemblies to seal the annulus. A similar device also is shown in U.S. Pat. No. 4,113,564 to J. Garin et al.

U.S. Pat. No. 4,135,973 to M. Golden discloses yet another apparatus for sealing an annulus about a rotating plug. The apparatus comprises an inflatable sealing mechanism disposed in the annulus or near the annulus. The inflatable sealing mechanism is in fluid communication with the reactor cover gas such that in the event of an overpressurization of the reactor cover gas, the inflatable sealing mechanism is expanded to enhance the sealing of the annulus.

A system for controlling the escape of radioactive particles is disclosed in U.S. Pat. No. 4,069,100 to M. Cooper. The system disclosed therein reduces the leakage of fission gases from the cover gas through a joint between a pressure vessel and plug by installing an absorbent material between two seals placed in the joints. The absorbent material is intended to provide sufficient delay time to allow all the radioactive isotopes, except long-lived nuclides, to decay to innocuous radiation levels before escaping from the pressure vessel.

Various problems are encountered with the prior art sealing devices. Specifically, when a sodium dip seal is used, the liquid sodium has a vapor pressure which results in the formation of sodium frost on the walls of the annulus. In addition, it has been found that radioactive elements in the cover gas also will permeate through the sodium seal as well as the conventional inflatable seals. Thus, there still is need for an improved sealing system which could ensure reliable and safe operation of the reactor under all circumstances and minimize the potential for escape of any radioactive gases. It also should be capable of preventing any significant leakage of oxygen from the outside of the vessel into the interior of the reactor where it could contact the liquid sodium coolant.

SUMMARY OF THE INVENTION

The present invention provides a system for sealing an annulus defined by a first and second component of a nuclear reactor closure head wherein insulation means is provided adjacent to a bottom surface of the components and above the liquid metal coolant for maintaining at least an upper surface of said components at substantially ambient temperatures. The sealing system includes at least a first and second inflatable seal disposed in an upper portion of the annulus for sealing said annulus when they are inflated and permitting rotation of one of the components when they are partially deflated. There also is included a liquid metal dip seal disposed in the annulus and extending into the insulation means. The dip seal includes a trough on one of said components and seal blade pendently supported from the other component and extending downwardly into the trough. A body of liquid metal is contained in the trough which submerges a portion of the seal blade. The seal blade is provided with at least one aperture located above the liquid metal for providing fluid communication from one side of the blade to the other. A passageway is provided to permit fluid communication between the area above the trough on one side of the seal blade and the cover gas in the nuclear reactor vessel. In accordance with the present invention, a purge gas is introduced into the annulus intermediate the inflatable seals and the other side of the seal blade, the purge gas being introduced in an amount sufficient to substantially reduce diffusion of radioactive cover gas or sodium vapor up to the inflatable seals. The purge gas mixes with the cover gas and is withdrawn from the vessel for treatment and recycle to the vessel.

BRIEF DESCRIPTION OF THE DRAWINGS

It is believed the invention will be more clearly understood from the following description taken in conjunction with the accompanying drawings wherein.

DESCRIPTION OF THE PREFERRED EMBODIMENT

Nuclear reactors which utilize rotatable plugs in the closure head of the reactor vessel, of necessity, must have an annular passageway defining a clearance gap between the rotatable plug and associated apparatus to allow for rotation of the plugs. In order to prevent the escape of radioactive gases from the interior of the vessel and to prevent air from seeping into the vessel, seals must be provided to block the annular passageway. The present invention provides a system for sealing such annular passageways in liquid metal-cooled reactors.

Figure 1:
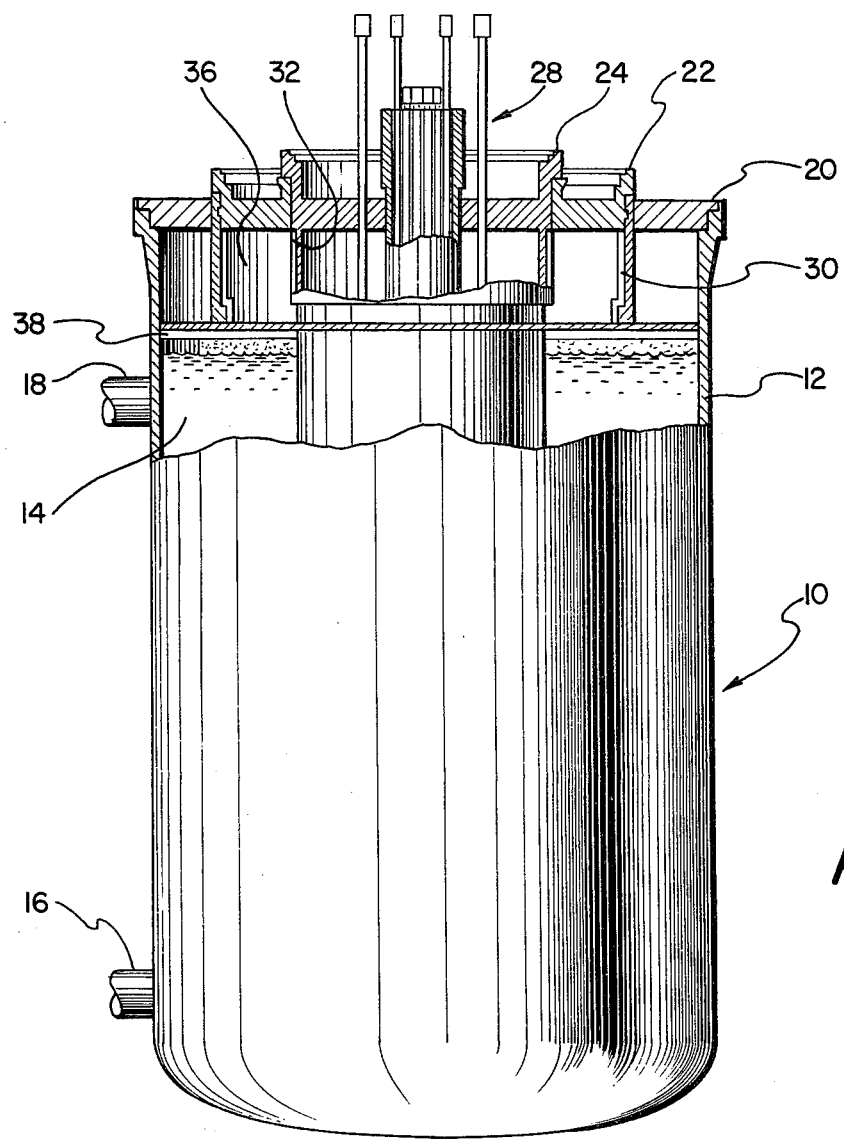
FIG. 1 is a partial cross-sectional view in elevation of a typical nuclear reactor.
Figure 2:
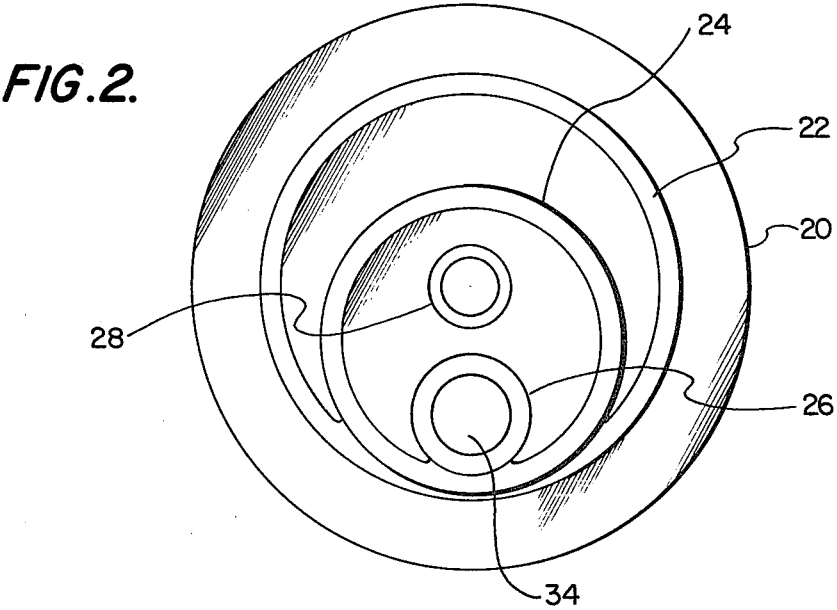
FIG. 2 is a plan view of the nuclear reactor shown in FIG. 1.

Referring to FIGS. 1 and 2, therein is depicted a typical nuclear reactor assembly 10. Reactor assembly 10 includes a vessel 12 which contains a body of coolant 14. Immersed in coolant 14 is a nuclear reactor core (not shown) which comprises an array of fuel assemblies that produce heat. Reactor vessel 12 has an inlet 16 and an outlet 18 through which coolant 14 is circulated in heat transfer relationship with the fuel assemblies. Vessel 12 is closed at its upper end by a closure head which comprises a stationary outer member 20, a large rotatable plug 22, an intermediate rotatable plug 24, and a small rotatable plug 26. Intermediate rotatable plug 24 also has located therein a plurality of control rods and drive mechanism 28 for regulating the amount of heat produced in the nuclear reactor core.

It is seen that the inner periphery of stationary member 20 and the outer periphery of large rotating plug 22 define an annulus 30. In a similar manner, the inner surface of large rotating plug 22 and the outer surface of intermediate rotating plug 24 also define an annulus 32. In a like manner, intermediate rotating plug 24 and small rotating plug 26 also define an annulus.

It also will be noticed that intermediate rotatable plug 24 is disposed eccentrically within large rotatable plug 22 and that small rotatable plug 26 is similarly disposed within intermediate rotatable plug 24. Generally, small rotatable plug 26 further includes an access means such as a collar 34 to provide access for an in-vessel transfer machine (not shown). When refueling becomes necessary, an in-vessel transfer machine is placed on the bore of collar 34. Once the machine is in place, an appropriate combination of rotations of rotatable plugs 22, 24, and 26 will align the in-vessel transfer machine in appropriate relation with the reactor core for removal and replacement of selected fuel assemblies.

Reactor assembly 10 further includes a large mass or body of insulation 36 which is located adjacent to a lower portion of the closure head and above the body of liquid coolant 14. In the particular embodiment depicted, the insulation comprises a plurality of reflective plates, however, numerous other equivalents will be apparent to those skilled in the art. The purpose of insulation 36 is to maintain the external surfaces of the rotating plugs at substantially ambient temperatures. By maintaining these external surfaces or head access areas at ambient temperatures, access to these areas for maintenance by personnel is greatly facilitated. In addition, this also provides a cooler operating environment for the bearings and various drive mechanisms which, in turn, permits the use of a broader range of bearings, seals, and drive mechanism materials.

As previously discussed, when reactor coolant 14 is a liquid metal such as sodium, as is generally the case with fast breeder reactors, it is necessary to prevent oxygen in the air from permeating through the vessel and contacting the liquid sodium. Such contact could result in the formation of undesirable sodium oxide impurities since the sodium oxide, having a higher melting point, would be in the form of solids which could plug passageways through the reactor core resulting in uneven cooling of the core. Further, the presence of such solid impurities could have a deleterious effect on other various parts of the primary cooling system, such as pumps and valves. Accordingly, it has become customary to provide an inert cover gas, such as argon, in vessel 12 to fill a zone 38 above coolant 14. While the cover gas prevents oxygen from contacting coolant 14, it also is subjected to radiation exposure from the core and thus becomes contaminated with radioactive gases and particles. Thus, it also is necessary to circulate the cover gas between the reactor vessel and a cleaning apparatus to remove most of the radioactivity prior to venting it or returning it to the reactor. The manner in which the radioactivity is removed is well known in the art. Also, as previously indicated, it is necessary to prevent the cover gas from escaping up through the annuli and out of the reactor vessel.

Figure 3:
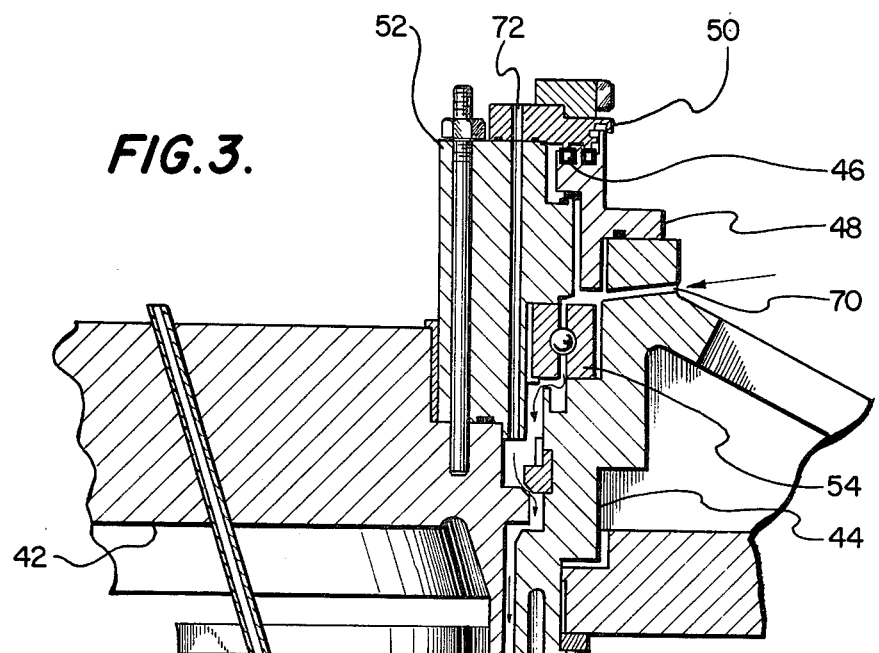
FIG. 3 is a cross-sectional view in elevation of a typical closure head sealing system of the present invention.
Figure 4:
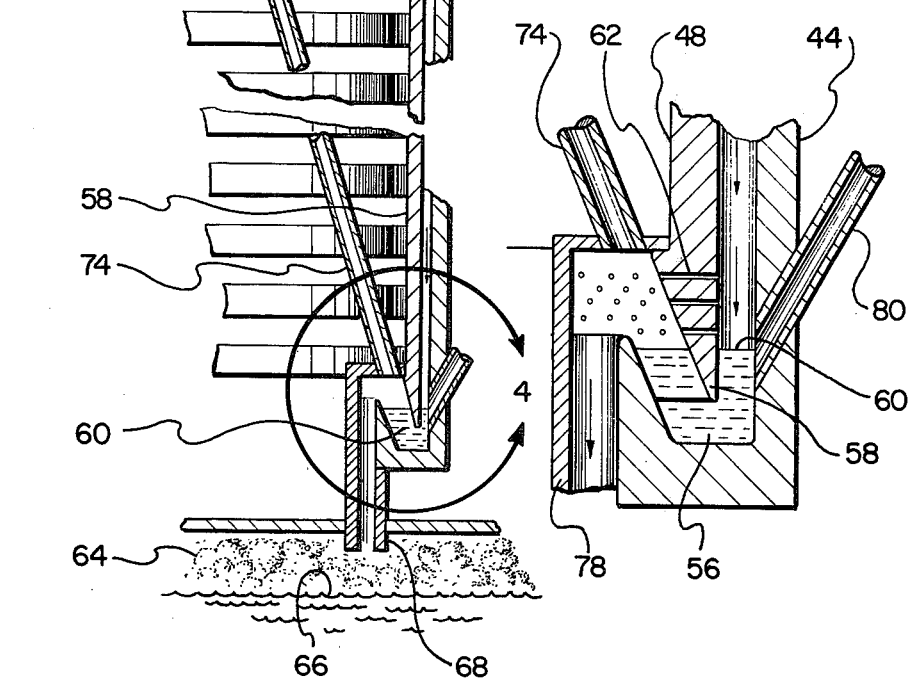
FIG. 4 is an enlarged view of the dip seal shown in FIG. 3.

Referring now to FIG. 3, therein is depicted a typical annulus and sealing system of the present invention. A typical annulus 40 is defined by a rotating plug member 42 and an adjacent component 44. Adjacent component 44 could be the inner periphery of a stationary member of the reactor vessel or an adjoining rotating plug. Annulus 40 is sealed at its upper end by two inflatable seals 46 which are retained in place by a seal holder 48. The upper surfaces of inflatable seals 46 are engaged by a seal runner 50 which is connected to rotating plug 42 via a bearing holder member 52. Also located in annulus 40, below seals 46, is a bearing member 54 to facilitate rotational movement between rotatable plug 42 and adjacent component 44. The lower end of annulus 40 terminates in a dip seal which is shown in greater detail in FIG. 4. The dip seal comprises a trough 56 formed by the lower end of adjacent component 44. Extending into the trough is a blade member 58 formed by the lower end of and pendently supported from rotatable plug 42. Trough 56 contains a pool of a liquid metal such as a pool of liquid sodium 60 which submerges a lower portion of blade member 58. In contrast to the dip seals used heretofore, in accordance with the present invention, blade member 58 is provided with at least one aperture 62 which provides fluid communication from one side of blade 58 to the other. The other side of blade 58 is in fluid communication with the cover gas in area 64 (which is located above a body of liquid metal coolant 66) via a passagesway 68 which is a continuation of annulus 40.

Referring again to FIG. 3, it is seen that intermediate inflatable seals 46 and bearing member 54, there is provided a passageway 70 for the introduction of a purge gas into annulus 40. Advantageously, there also is provided means for access to annulus 40. As depicted in FIG. 3, this is provided for by a removable plug (not shown) and a passageway 72 in bearing holder 52. Removal of the purge gas and cover gas for treatment is provided for by any of the various known gas withdrawal means.

It is a particular feature of the present invention that the dip seal is located above liquid metal coolant 66 and in body of insulation 76 a sufficient height such that during the normal reactor operating temperature variations, the pool of liquid sodium 60 in trough 56 remains within the range of from about 149° to 260° C. (300° to 500° F.). It has been found that if the temperature substantially exceeds the upper limit, sodium vapor pressure will result in an excessive formation of sodium frost in annulus 40, while lower temperatures may not be sufficient to reliably maintain the sodium in a liquid state. To further reduce the probability of sodium vapor migrating up through annulus 40, the width of the annulus preferably is maintained within the range of from about 12.7 to 38.0 mm (0.5 to 1.5 inches). Usually, it is preferred to maintain the annulus width at about 25.4 mm (1 inch). In some instances, it may be desirable to provide a means 74 and 80 for access to trough 56 of the dip seal either for inspection of the liquid sodium therein or in the unlikely event that it becomes necessary to rewet blade 58. Specifically, at the preferred temperatures set forth hereinbefore, sodium will not readily rewet blade 58 and thus some cover gas could migrate through the dip seal. Accordingly, by providing an additional conduit member 78, it is possible to insert a heating element to raise the temperature of the sodium or alternatively to insert an ultrasonic probe which also will effectively cause rewetting of blade 58.

In operation, a purge gas is introduced (from a source not shown) through passageway 70 where it flows through bearing 54 and down through annulus 40. The purge gas velocity through annulus 40 and the length of the annulus (in the direction of gas flow) is selected to control the rate of diffusion of radioactive cover gas through the annulus. Obviously, of course, the higher the velocity of gas flow, the less radioactive cover gas will diffuse upwardly through annulus 40. However, in view of the cost of the purge gas and the necessity of its removal and treatment, it is desirable to keep the purge gas flow rate as low as possible, consistent with controlling a desired amount of diffusion of radioactive cover gas. Accordingly, the purge gas velocity is established so that the diffusion of radioactive cover gas passing through the annulus is not sufficient to be detrimental to inflatable seals 46 and further that the amount which will diffuse through the inflatable seals will not exceed the allowable radiation level in the area outside the vessel.

The radioactive cover gas diffusing up the annulus is diluted by the downflow of purge gas which further assists in reducing its activity. In addition, the time the cover gas is in transit through the annulus prior to its reaching inflatable seals 46 allows for a substantial amount of decay of the shorter-lived radioactive elements. The two together can be controlled such that the activity of the cover gas reaching the inflatable seals is sufficiently low that it will not cause damage to the seals so as to render them inoperable, and the activity of any cover gas diffusing through the inflatable seals is reduced such that its contribution to allowable dose rates is within specified limits.

The purge gas passing down through annulus 40 continues down the annulus through aperture 62 in blade 58 and from there mixes with the cover gas via passageway 68. Concurrently therewith, a mixture of cover gas and purge gas is withdrawable for treatment in accordance with known procedures.

It is another advantage of the present invention that the amount of sodium vapor deposited on the walls of annulus 40 in the form of a frost also is controllable. The amount of frost formed is dependent on, among other things, the temperature of the sodium, the temperature of the walls defining the annulus, and the width of the annulus. In accordance with the present invention, the temperature of the liquid sodium 60 in trough 56 is controlled to some extent by the location of trough 56 within insulation 76 such that during normal reactor operating temperatures, the sodium in the trough is maintained at a temperature of less than about 260° C. (500° F.) and above about 149° C. (300° F.) to minimize the sodium vapor pressure. In addition, the convection rate is further reduced to acceptable levels by maintaining the width of annulus 40 at about 1 inch or less. While the present invention does not totally eliminate the formation of sodium frost deposit in the annulus, it is possible to reduce it such that intervals between cleaning of the annulus can be increased to periods of 10 years or more before interference with plug rotation will occur.

In accordance with a preferred embodiment of the invention wherein there is provided a passageway 72 for inspection and access to the narrow width portion of annulus 40, periodic cleaning and inspection is possible. Further, during the cleaning operation, any sodium oxide particles which may have formed will fall to the bottom of trough 56 where they can slowly dissolve and are prevented from interfering with the normal liquid metal coolant flow paths.

While there has been described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, the present invention has been described with respect to liquid sodium as the liquid metal coolant and the liquid for use in the dip seal; various other liquid materials could be utilized which need not be alkali metals. Furthermore, the precise configuration of the various components depicted need not be the same as that depicted in the drawings, just as the manner in which the various components are assembled and secured to one another may vary as a matter of design choice. Accordingly, the scope of the invention should not be determined in accordance with the foregoing illustrative description but rather by the following appended claims.

I claim:

1. A liquid metal-cooled nuclear reactor system, including a vessel containing a cover gas, a body of liquid metal coolant located in a lower portion of the vessel, fuel assemblies positioned in the body of liquid metal coolant, at least one primary coolant flow system for circulating the liquid metal coolant in heat transfer relationship with the fuel assemblies, and a closure head disposed on an upper portion of the vessel in fluid-tight relationship therewith, said closure head comprising:

a first and second component defining an annulus therebetween;

insulation means disposed adjacent a bottom surface of said components and above the liquid metal coolant for maintaining an upper surface of said components at substantially ambient temperatures;

at least first and second inflatable seal means disposed in an upper portion of said annulus for sealing said annulus when they are inflated during normal reactor operation and permitting rotation of one of said components when they are partially deflated;

a liquid metal dip seal disposed in said annulus and extending into said insulation means, said dip seal including a trough on one of said components and a seal blade pendently supported from said other component and extended downwardly into the trough, a body of liquid metal in the trough which submerges a portion of the seal blade, the seal blade having at least one aperture located above the liquid metal for providing continuous fluid communication from one side of the blade to the other;

means for providing fluid communication between the area above the trough on one side of the seal blade and the cover gas;

means for introducing a purge gas intermediate the inflatable seals and the other side of the seal blade for passage through said at least one aperture, said means providing for the introduction of a sufficient amount of purge gas to substantially prevent migration of radioactive cover gas or sodium vapor up to the inflatable seals; and means for withdrawing purge gas and cover gas from the vessel for purification and return to the vessel.

2. The system of claim 1 further including means providing access to said liquid metal dip seal trough.

3. The system of claim 1 further including a bearing means disposed in said annulus for facilitating rotational movement between said first and second components, said bearing means being located intermediate said liquid dip seal and said inflatable seals.

4. The system of claim 3 wherein said means for introducing a purge gas provides for the introduction of the gas intermediate the inflatable seals and said bearing means.

5. The system of claim 1 wherein said liquid metal coolant and liquid metal in said dip seal are sodium.

6. The system of claim 1 wherein said annulus has a width of from 12.7 to 38.0 mm.

7. The system of claim 1 wherein said cover gas and purge gas are argon.

* * * * *